United States Patent
Miller et al.

(10) Patent No.: US 7,686,256 B2
(45) Date of Patent: Mar. 30, 2010

(54) CONFORMAL AERO-ADAPTIVE NOZZLE/AFTBODY

(75) Inventors: Daniel N. Miller, Bainbridge Island, WA (US); David D. Young, Keller, TX (US)

(73) Assignee: Lockheed Martin Corporation, Bethesda, MD (US)

(*) Notice: Subject to any disclaimer, the term of this patent is extended or adjusted under 35 U.S.C. 154(b) by 454 days.

(21) Appl. No.: 11/226,033

(22) Filed: Sep. 14, 2005

(65) Prior Publication Data

US 2006/0219847 A1    Oct. 5, 2006

Related U.S. Application Data

(60) Provisional application No. 60/667,964, filed on Apr. 4, 2005.

(51) Int. Cl.
*B64C 3/00* (2006.01)
*B64C 5/00* (2006.01)

(52) U.S. Cl. .......... 244/198; 244/200.1; 244/207

(58) Field of Classification Search ........ 244/200.1, 244/204.1, 204, 198
See application file for complete search history.

(56) References Cited

U.S. PATENT DOCUMENTS

| | | | | |
|---|---|---|---|---|
| 4,697,769 A * | 10/1987 | Blackwelder et al. | .... | 244/199.2 |
| 4,718,620 A * | 1/1988 | Braden et al. | .... | 244/130 |
| 4,736,913 A * | 4/1988 | Bennett et al. | .... | 244/130 |
| 5,255,881 A * | 10/1993 | Rao | .... | 244/199.1 |
| 5,362,179 A * | 11/1994 | Sirovich et al. | .... | 138/37 |
| 5,365,490 A * | 11/1994 | Katz | .... | 367/1 |
| 5,957,413 A * | 9/1999 | Glezer et al. | .... | 244/208 |
| 6,123,296 A * | 9/2000 | Mangalam | .... | 244/204 |
| 6,371,414 B1 * | 4/2002 | Truax et al. | .... | 244/201 |
| 6,715,717 B2 * | 4/2004 | Dixon et al. | .... | 244/130 |
| 2004/0046086 A1 * | 3/2004 | Dixon et al. | .... | 244/199 |

OTHER PUBLICATIONS http://focus.aps.org/story/v9/st5 (availabe on the web Nov. 3, 2002).*

* cited by examiner

*Primary Examiner*—Michael R Mansen
*Assistant Examiner*—Valentina Xavier
(74) *Attorney, Agent, or Firm*—Bracewell & Giuliani LLP

(57) ABSTRACT

The present invention provides flow field control techniques that adapt the aft body region flow field to eliminate or mitigate the development of massive separated flow field zones and associated unsteady vortical flow field structures. Embodiments of the present invention use one or more distributed arrays of flow control devices (submerged in the boundary layer) to create disturbances in the flow field that inhibit the growth of larger vortical structures and/or to energize the aft body shear layer to keep the shear layer attached the aft body surface. These undesirable aerodynamic phenomena produce increased vehicle drag which harms vehicle range, persistence, and loiter capabilities. Additionally, the unsteady nature of the turbulent vortical structures shed in the aft body wake region may produce increased dynamic buffeting and aft body heating by entraining nozzle jet exhaust (a.k.a. jet wash) —requiring additional structural support, shielding, and vehicle weight.

15 Claims, 12 Drawing Sheets synthetic jet effector micro-bubble effector

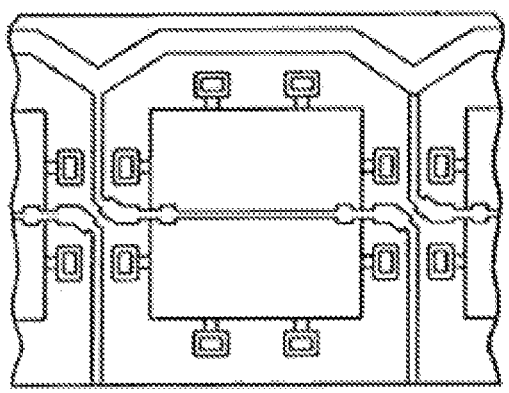
PRIOR ART
FIG. 9A mems sheer sensor
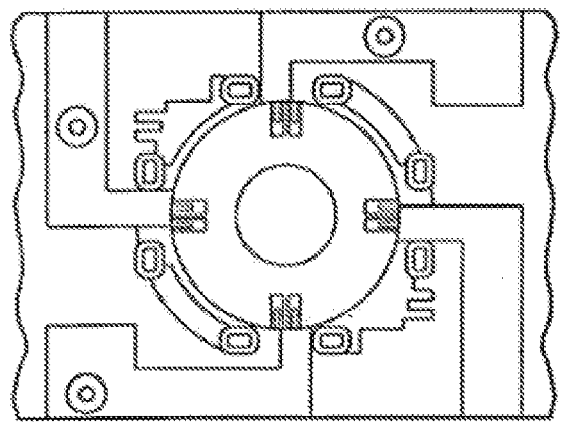
FIG. 9B mems pressure sensor
PRIOR ART
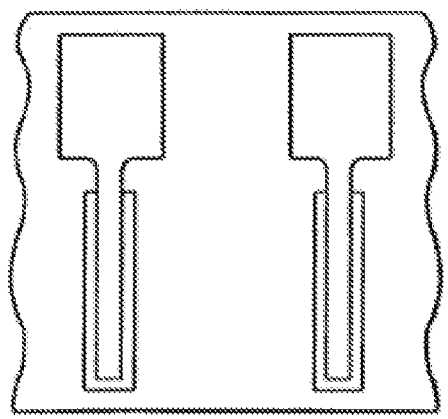
FIG. 9C mems velocity sensor
PRIOR ART

CONFORMAL AERO-ADAPTIVE NOZZLE/AFTBODY

CROSS REFERENCE TO RELATED APPLICATIONS

This application claims the benefit of priority to and incorporates herein by reference in its entirety for all purposes U.S. Provisional Patent Application No. 60/667,964 entitled "CONFORMAL AERO-ADAPTIVE NOZZLE/AFTBODY," by Daniel N. Miller, filed on Apr. 4, 2005.

TECHNICAL FIELD OF THE INVENTION

The present invention relates generally to the integration of the jet-engine flow path within aircraft and more particularly, a system and method for integrating propulsion nozzle flow paths into advanced all-wing platforms while meeting weight and volume requirements of these platforms.

BACKGROUND OF THE INVENTION

The aerodynamic design and integration of the jet-engine flow paths within next generation aircraft plays a major role in determining the capability and configuration of these aircraft. Next generation tailless aircraft, such as a blended wing body configuration, will have highly integrated propulsion flow paths which are buried or submerged into the platform. Such configurations often have significant boat-tail regions with aft-facing body surfaces that blend into the aft body and exhaust region. These aft-facing sloped surfaces often exhibit large adverse pressure gradients, flow field separation, and large-scale vortices. Additionally, exotic aperture shapes for the nozzle outlets may cause excessive propulsion performance losses. These losses may emanate from strong secondary flow gradients in the near wall boundary of the fluid flow, which produce large-scale vortical flow field structures. Aft body flow field detachments may produce increased aft body drag, aerodynamic buffeting, and jet wash heating. All of which comprise the integrity and capability of these aircraft.

In the past, adverse flow field vortical structures were avoided or addressed by the aircraft's design. For example, the overall aircraft could be lengthened to prevent massive aft body flow field detachments. Conventional large scale counter rotating vane vortex generators could be employed to address these flow field issues. Alternatively, the components in the path of the massive aft body flow field detachments may be structurally hardened (increasing weight) or replaced more frequently to avoid failures resulting from these stresses. Components in the path of these flow field structures may also be repositioned to non-optimal positions to reduce these stresses. However, these situations often results in reduced vehicle performance. Similarly, adding structural weight to support increased stress loads also result in reduced vehicle performance.

The aerodynamic design and integration of the jet-engine flow path plays a major role in determining the capability and configuration of aircraft such as the unmanned aerial vehicle (UAV), long-range strike (LRS), and multi-mission air mobility systems. To enable advances in vehicle design, ground-breaking aerodynamic technologies are required to integrate the propulsion nozzle flow path into these advanced all-wing platforms. Such technologies are required to meet more restrictive requirements for reduced weight/volume and mechanical complexity while aerodynamically accommodating exotic vehicle shaping requirements, without compromising functionality and performance.

These advanced jet engine flow paths may require vehicle-conforming (or conformal, compact, fixed-flow path, serpentine) designs with nozzles that provide thrust vectoring, throttling, and cooling capabilities. Aerodynamic design laws governing high-speed, viscous flow have limited integration of these next-generation designs required to meet the goals outlined for next generation aircraft. The Fixed-Wing Vehicle and Versatile Affordable Advanced Turbine-Engine initiatives are one example of such goals. New aerodynamic design solutions are required to integrate these exotic configurations into advanced vehicle aft bodies without seriously compromising vehicle design and capability.

To integrate these nozzles, previous solutions lengthen the vehicle aft fuselage to maintain a minimum aft body boat tail angle based on conventional aerodynamic design laws or used a shorter aft body length, but must live with the consequences of massive aft body flow field detachment or separation which produces increased aft body drag, aerodynamic buffeting, and jet wash heating, hence compromising vehicle capability.

New technology is therefore needed which will allow greater freedom to integrate advanced nozzle configurations while maintaining more compact aft body lengths by eliminating or mitigating the large-scale separated flow field zones and associated unsteady vortical flow field structures in the external nozzle/aft body region. The benefits of such a technology to aerodynamically "adapt" the flow field to aggressive nozzle/aft body integration designs for advanced platforms will be to enable reduced vehicle size and weight, favorable movement of vehicle center of gravity (Cg) forward, reduced drag, reduced aft body structural heating, and improved flight performance. Application of such a technology is not only limited to being a design enabler for future all-wing air-vehicle designs, but also could be applied to existing aircraft as a retrofit package for reducing drag, buffeting, and aft body heating.

SUMMARY OF THE INVENTION

The present invention provides flow field control techniques that adapt the flow field to eliminate or mitigate the development of massive separated flow field zones and associated unsteady vortical flow field structures. These undesirable aerodynamic phenomena produce increased vehicle drag which harms vehicle range, persistence, and loiter capabilities. Additionally, the unsteady nature of the turbulent vortical structures shed in the aft body wake region aft bodies may produce increased dynamic buffeting and aft body heating by entraining nozzle jet exhaust (a.k.a. jet wash) —requiring additional structural support, shielding, and vehicle weight.

Embodiments of the present invention use one or more distributed arrays of flow control devices (submerged in the boundary layer to create disturbances in the flow field that inhibit the growth of larger vortical aerodynamic flow field structures and/or to energize the aft body shear layer to keep the shear layer attached the aft body surface. The flow control devices may be either small-scale positive displacement sub-boundary layer vanes (or microvanes) and/or conformal jets (or micro-jets). These flow control devices are sized on the order of the momentum thickness (rather than the full boundary layer thickness or larger). Additionally, these flow control devices may be passive and/or active flow control devices.

Manipulating the shedding, size and trajectory of the flow field near the aft body involves locating flow control arrays at the aerodynamic surface (disturbances). These micro-jet arrays induce secondary flow structures within the boundary layer of the fluid flow. The secondary flow structures manipulate the shedding, size and trajectory of the flow field vortical structures. In fact, these disturbances allow the inception point, trajectory and size of the previously appreciable massive flow field separations to be actively influenced. By controlling the inception, size, and trajectory of the flow field vortices, it is possible to reduce stress, buffeting, fatigue, and jet washing of the aircraft aft body.

Reducing the structural loads imposed on components allow the aircraft structure to better manage stress loads on individual components without additional hardening or support. Such improvements allow reduced observability, improved control, reduced weight and surface area by reducing the pylon or nacelle.

Another embodiment senses the flow conditions over the aft body region surface. This information is compared with desired fluid flow conditions to actively and dynamically control active portions of the flow control device arrays in order to achieve a desired fluid flow.

Embodiments of the present invention may use minimally intrusive arrays of flow control devices which are smaller, lighter weight, more efficient, lower drag, and less visible than conventional vortex generators devices. Furthermore, such devices may only reduce drag, but also reduce unsteady buffeting loads and jet wash heating on the aft body. The reduction of flow field separation and unsteady vortices with the application of embodiments of the present invention will help to enable next generation aircraft and improve the capabilities of existing aircraft.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIGS. 9A-9C depict various potential sensors;

DETAILED DESCRIPTION OF THE INVENTION

Preferred embodiments of the present invention are illustrated in the figures like numerals being used to refer to like and corresponding parts of the various drawings.

The present invention provides a system and method for manipulating aerodynamic or hydrodynamic fluid flow over an aft body surface that substantially eliminates or reduces disadvantages and problems associated with proper designs. More specifically, the present invention provides a system and method to prevent or minimize the growth of larger vortical structures that subject the aft body to buffeting, fatigue or jet wash through the use of arrays of flow control devices such as micro-jets or microvanes. This system and method includes the placement of micro-jet or microvane arrays on aft body surfaces bounding the primary fluid flow. These passive or active effectors can then manipulate the flow behavior of the fluid flow, influence the inception point, size, and trajectory of flow field vortices within the fluid flow, and reduce flow separation within the primary fluid flow.

Figure 1:
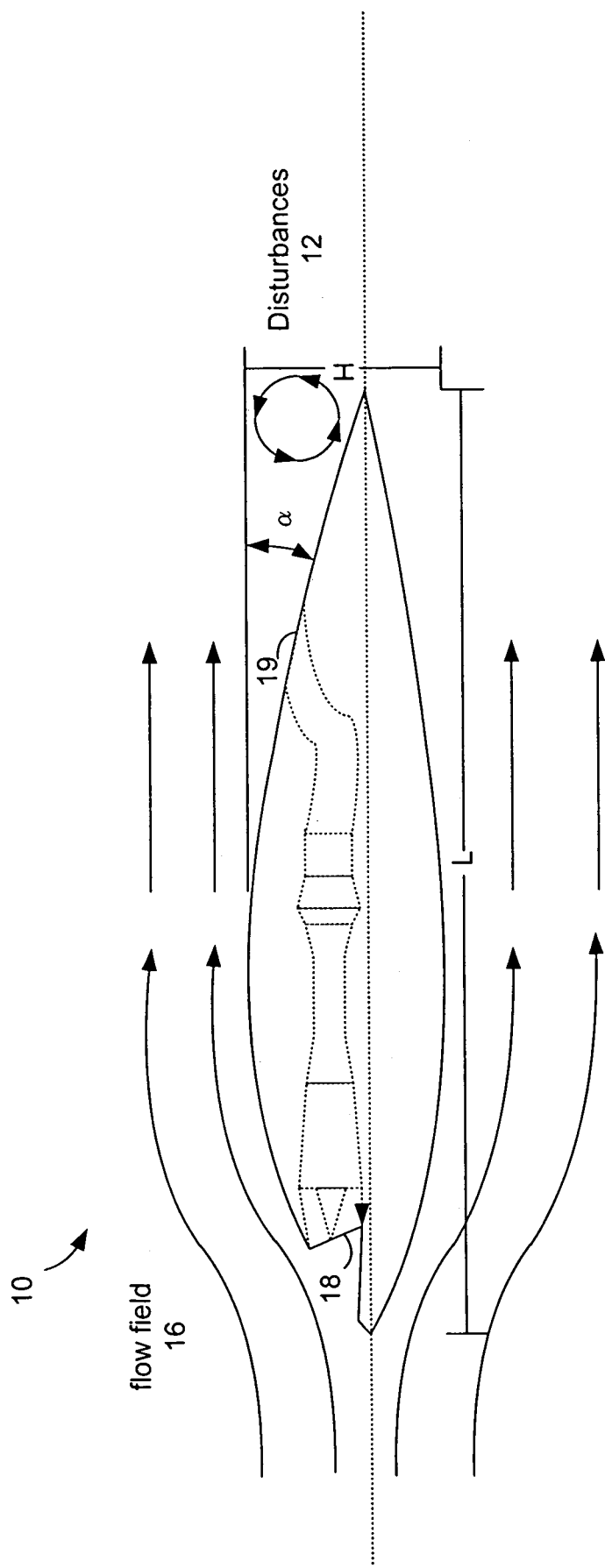
FIG. 1 provides a side view of a next generation aircraft that may experience flow field separations to be addressed by embodiments of the present invention.
Figure 2:
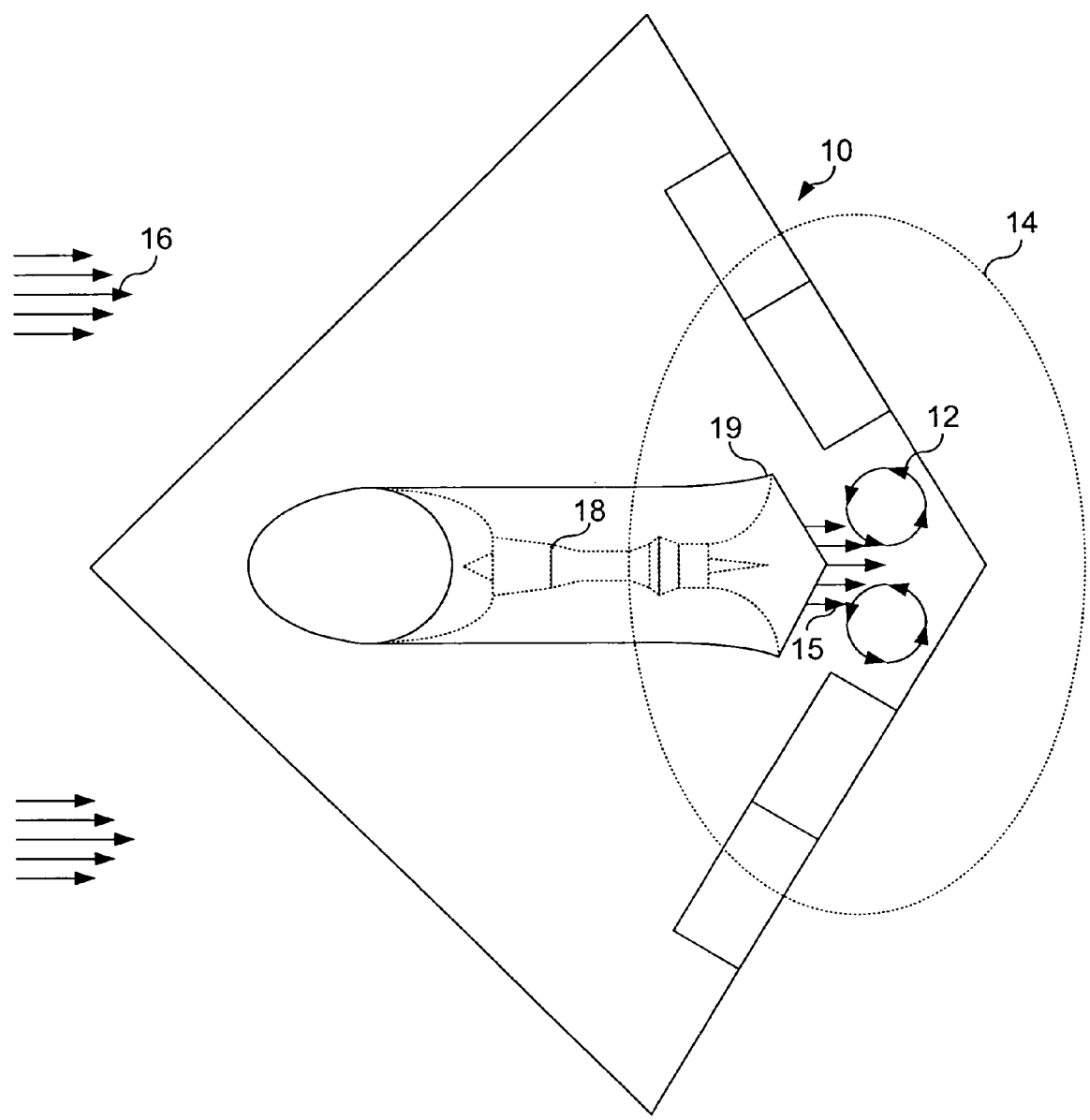
FIG. 2 provides a top down view of a next generation aircraft that may experience flow field separations to be addressed by embodiments of the present invention.

FIG. 1 provides a side view of an all wing platform wherein the overall length of the vehicle is often determined by the propulsion system and associated ducting. Serpentine ducts within the aircraft require a certain mold line in order to avoid large massive flow field separation vortices that increase drag and may pull hot exhaust gases towards the back of the aircraft. The all wing platform illustrated in FIGS. 1 and 2 may experience separated flow field zones and associated unsteady vortical structures in the vicinity of the aft body region of the aircraft. These undesirable aerodynamic phenomena produce increased drag which may reduce the capabilities of aircraft 10. Specifically, these aerodynamic phenomena may effect vehicle range, persistence, and loiter capabilities. In addition, the unsteady nature of the turbulent vortical structures 12, as illustrated in FIGS. 1 and 2, shed in aft body wake region 14, may produce increased buffeting and aft body heating by entraining jet nozzle exhaust 15 from nozzle 19. Previous solutions typically required additional structural support and thermal shielding. This resulted in an increased weight of aircraft 10.

FIG. 1 provides a cross sectional view of a next-generation aircraft 10. Aircraft 10 may be a blended wing body aircraft wherein engine 18 is submerged within the blended wing body of aircraft 10. Distributed arrays of flow control devices submerged in the boundary layer above and below exhaust nozzle 19 help create disturbances in flow field 16 over the aft body portion 14 in order to inhibit the growth of large vortical structures. Additionally, these flow control devices may energize the aft body sheer layer in order to keep the aft body sheer layer attached to the aft body surface of the aircraft.

The flow control devices may include arrays of small scale positive displacement sub-boundary layer vanes (i.e. microvanes) and/or conformal jet (i.e. micro-jets) that are sized on the order of the momentum thickness (rather than the full boundary layer thickness). These microvanes and micro-jets may be employed as active, passive, or a combination of both passive and active flow control devices.

FIG. 2 provides a top-down view of a next-generation aircraft 10. The engine may be submerged at or near the centerline of the aircraft as shown. Other embodiments may distribute multiple engines away from the centerline of the aircraft. The engine and other internal equipment may require a minimum height to be associated with aircraft 10. Previously, design rules then avoided massive separation of the flow field in the aft body region by lengthening the fuselage to maintain a minimum aft body boat tail angle. However, as the length of aircraft 10 is reduced or the height is increased, the boat tail angle α of the aft body increases. The boat tail angle is more clearly illustrated in FIG. 1. This increased boat tail angle results in growth of large vortical structures in the aft body region of the aircraft.

Figure 3:
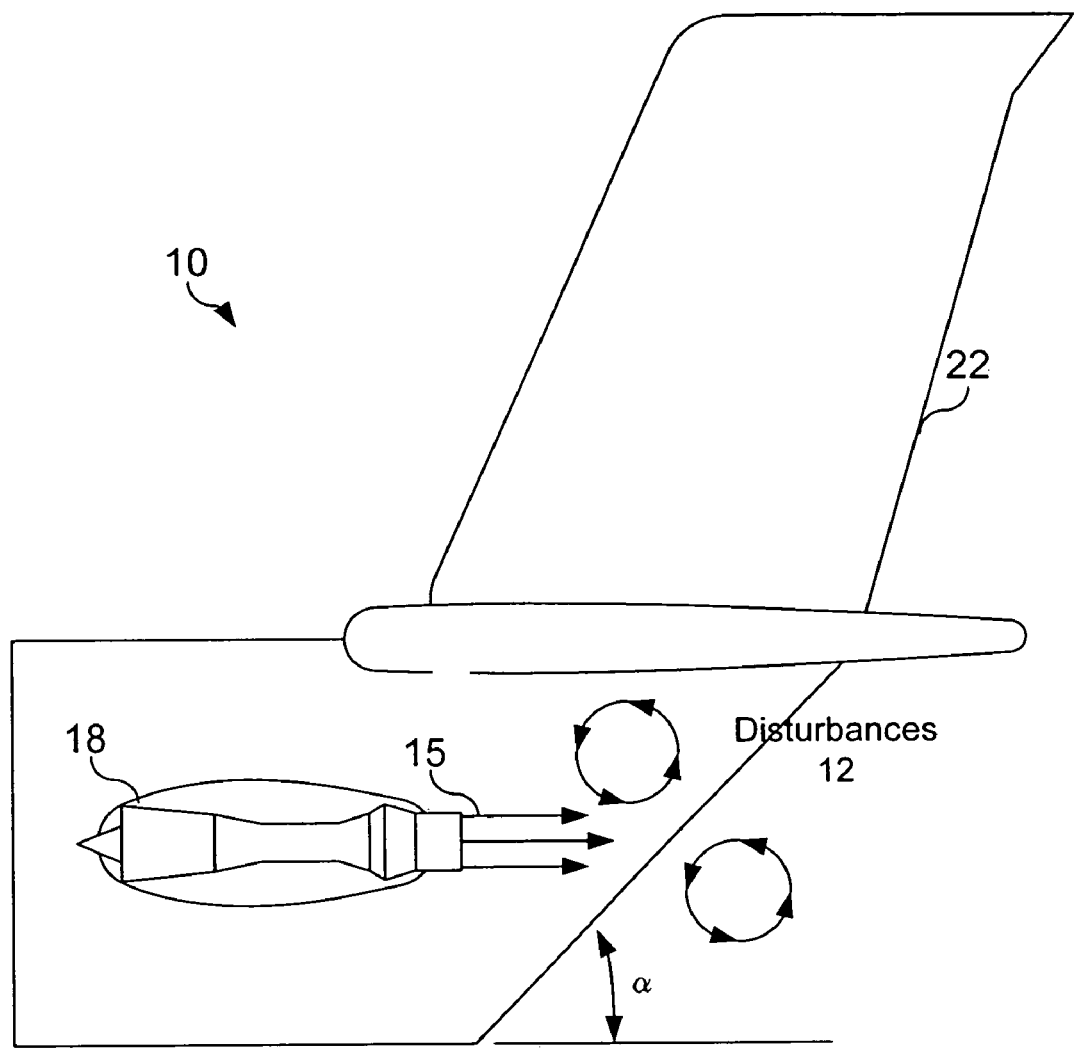
FIG. 3 provides a side view of an existing aircraft design that may experience flow field separations in the aft body region that are to be addressed by embodiments of the present invention.

FIG. 3 illustrates that the production and buffeting of the aft body portion 14 of aircraft 10 is not unique to next generation aircraft. Depending on the boat tail angle, α, and the placement of engines 18 or other components relative to the aft body portion, large vortical structures 12 may form and buffet the tail section 22 of the aircraft. Embodiments of the present invention may be employed to both the next generation aircraft and existing aircraft in order to minimize or reduce the negative effects of the turbulent vortical structures shed in the aft body wake region.

Figure 4:
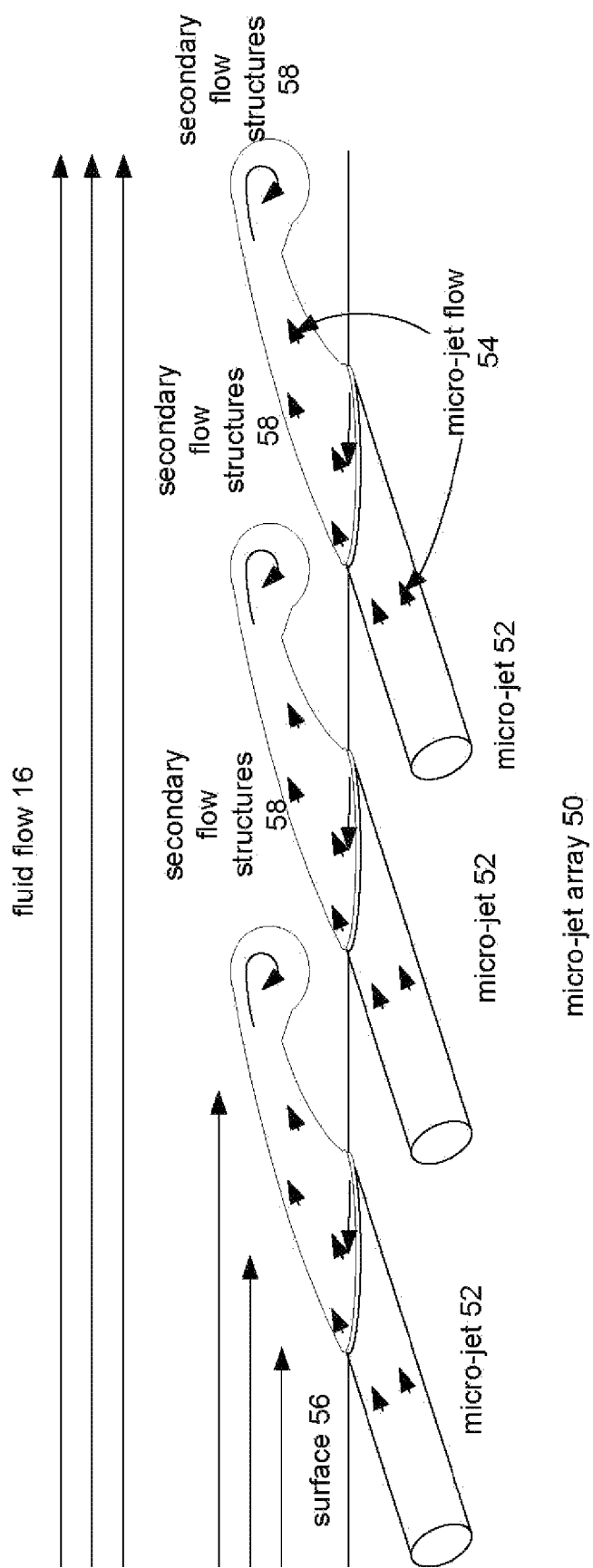
FIG. 4 depicts an array of micro-jets operable to introduce secondary flow structures in accordance with the present invention.

FIG. 4 depicts an array 50 of flow control devices, such as micro-jets 52. Alternate embodiments may supplement or replace micro-jets 52 with microvanes or other like flow control devices. The micro jets, microvanes or other like flow control devices are submerged within the boundary layer. As shown, micro-jets 52 introduce a micro-jet flow 54 that causes disturbances 58 in the flow field above aerodynamic surface 56. Thus, flow control device 52 introduces disturbances 58 that influence the inception point, size, and trajectory of flow field vortical structures within fluid flow 16. The flow control devices 52 are operable to apply control to the aft body region above and below the exhaust nozzle.

One potential implementation applies these flow control devices arrays to a vehicle, such as but not limited to aircraft of FIGS. 1-3. Other aerodynamic vehicles such as automobiles, trucks, trains, and boats that are sensitive to aerodynamic constraints may have the flow control device arrays applied to address aerodynamic concerns and improve the aerodynamic performance of these vehicles.

These micro-jet arrays 74 may use continuous or pulsating air jets for boundary layer control. These micro-jets, which may be placed above and below the exhaust nozzle, manipulate the shedding, size, and trajectory of vortical structures as well as the boundary layer to improve the performance of aircraft 10. Previous solutions may have merely used static vortex generators to manipulate the boundary layer and flow structures.

Figure 5:
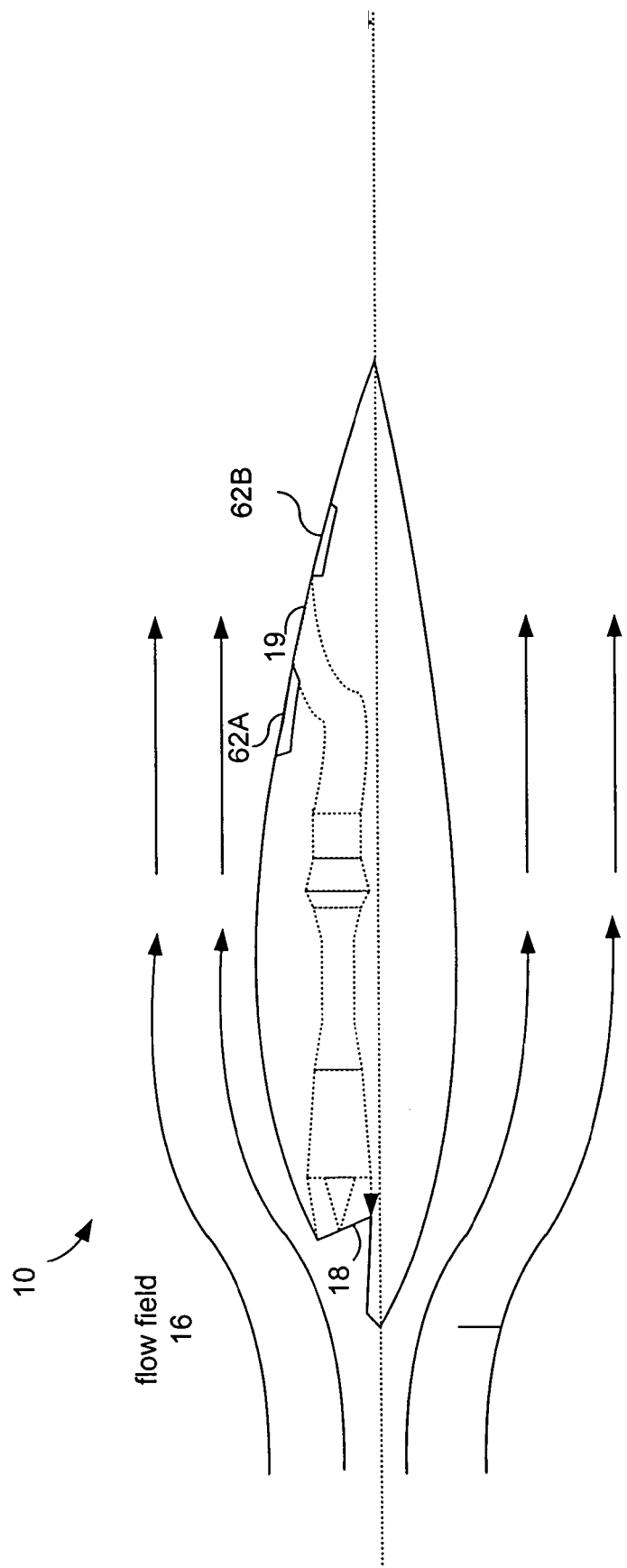
FIG. 5 depicts an array of flow control devices in the aft body region of a next generation aircraft operable to introduce secondary flow structures in accordance with the present invention.

FIG. 5 depicts a next generation aircraft 10 such as the blended wing body aircraft illustrated in FIGS. 1 and 2 wherein flow control device arrays 62A and 62B are located in the aft body region, above and below exhaust nozzle 19 of the aircraft. This allows the effects of a larger boat tail angle to be mitigated and prevent the massive flow field separation that resulted in buffeting and jet wash of aft body region of aircraft 10. As shown here, flow control device arrays 62A and 62B are placed proximate to exhaust port 19 of jet engine 18 which has been submerged within the body of aircraft 10. Array 62A is placed upstream of the exhaust port 19 while flow control array 62B is placed downstream of exhaust port 19. Other similar flow control device arrays may be located to manipulate flow field distortions caused by the boat tail angle of the aircraft that is not necessarily near the engine exhaust. The height of aircraft 10, and hence the boat tail angle, may be dictated by internal equipment or the man compartment contained within aircraft 10. These again also limit the flow field separation experience near the lateral centerline of aircraft 10.

Figure 6:
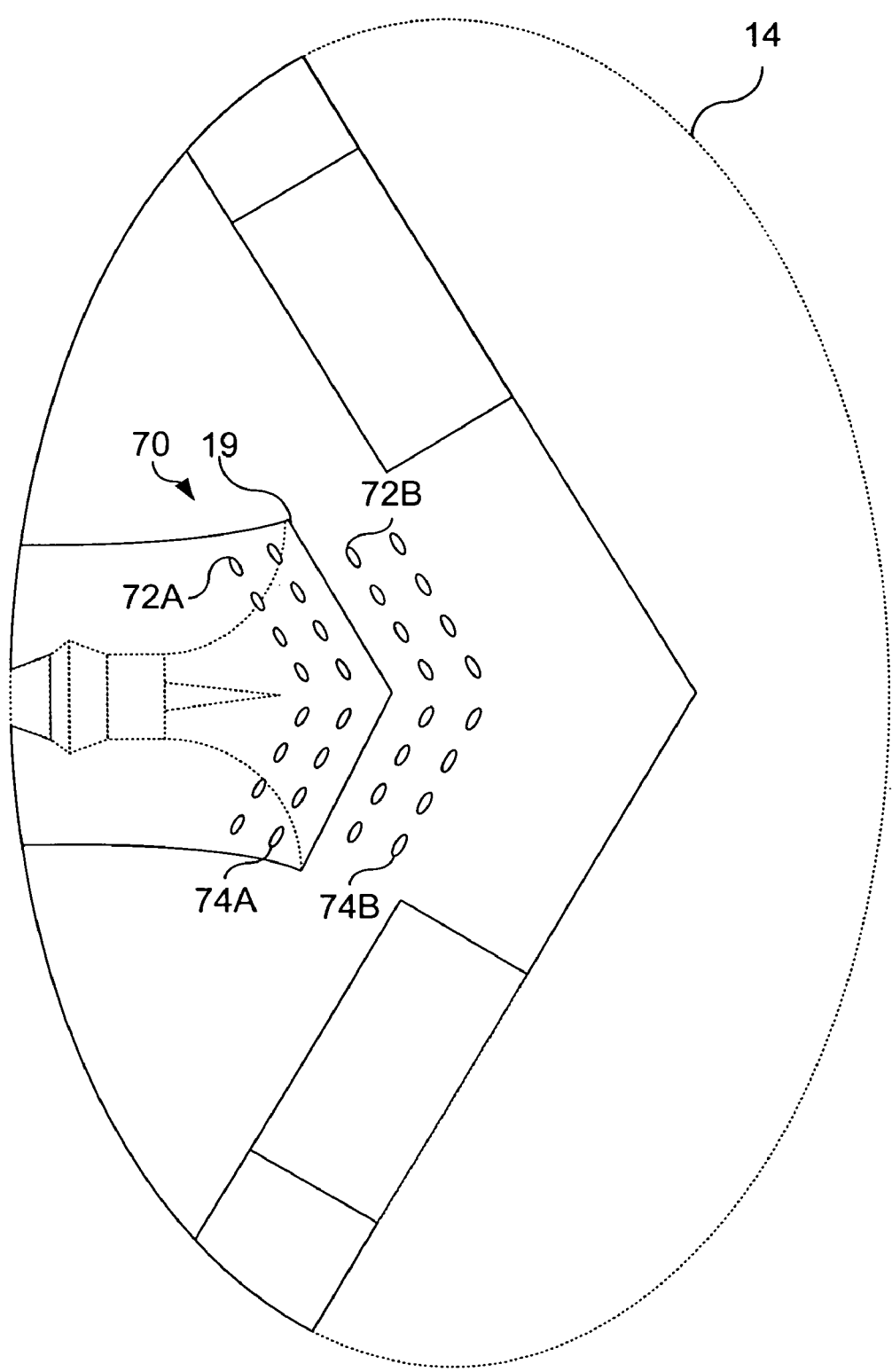
FIG. 6 provides a top down view of an array of flow control devices in the aft body region of a next generation aircraft operable to introduce secondary flow structures in accordance with the present invention.

FIG. 6 provides a top-down view of aft body portion 14 of the aircraft illustrated in FIG. 2. Here, engine 18 is submerged at or near the centerline of blended wing body of next generation aircraft 10. This engine is located near the centerline as this aircraft may be an unmanned vehicle that may not have all the height requirements of a manned blended winged body aircraft illustrated in FIGS. 1 and 2. Here, array 70 of flow control devices includes both microvanes 72 and micro-jets 74. The microvanes may be passive devices while the micro-jets may be active devices that may be dynamically controlled depending on the capabilities of these jets or suction devices. Thus, the array of flow control devices may be both active devices, such as micro-jet 74, and passive devices, such as microvane 70. As shown, microvanes 72A and micro-jets 74A are located above exhaust nozzle 19, and microvanes 72B and micro-jets 74B are located below exhaust nozzle 19.

The present invention provides a conformal aero adaptive nozzle for the aft body region of a vehicle such as an aircraft. Arrays of flow control devices adapt the flow field proximate to the aft body region on the vehicle to eliminate or mitigate the development of massive separated flow field zones and associated unsteady vortical flow field structures. This involves the use of one or more distributed arrays of flow control devices submerged in the boundary layer to create disturbances in the flow field that inhibit the growth of larger vortical structures, prevent or limit the separation of flow field zones proximate to the aft body region, and/or energize the aft body sheer layer to keep the sheer layer attached to the aft body region. These flow control devices such as micro-jets or microvanes that introduce disturbances of secondary flow structures in the near boundary layer in order to affect flow field separation, or the reduction of vortical structures proximate to the aft body region.

Figure 7:
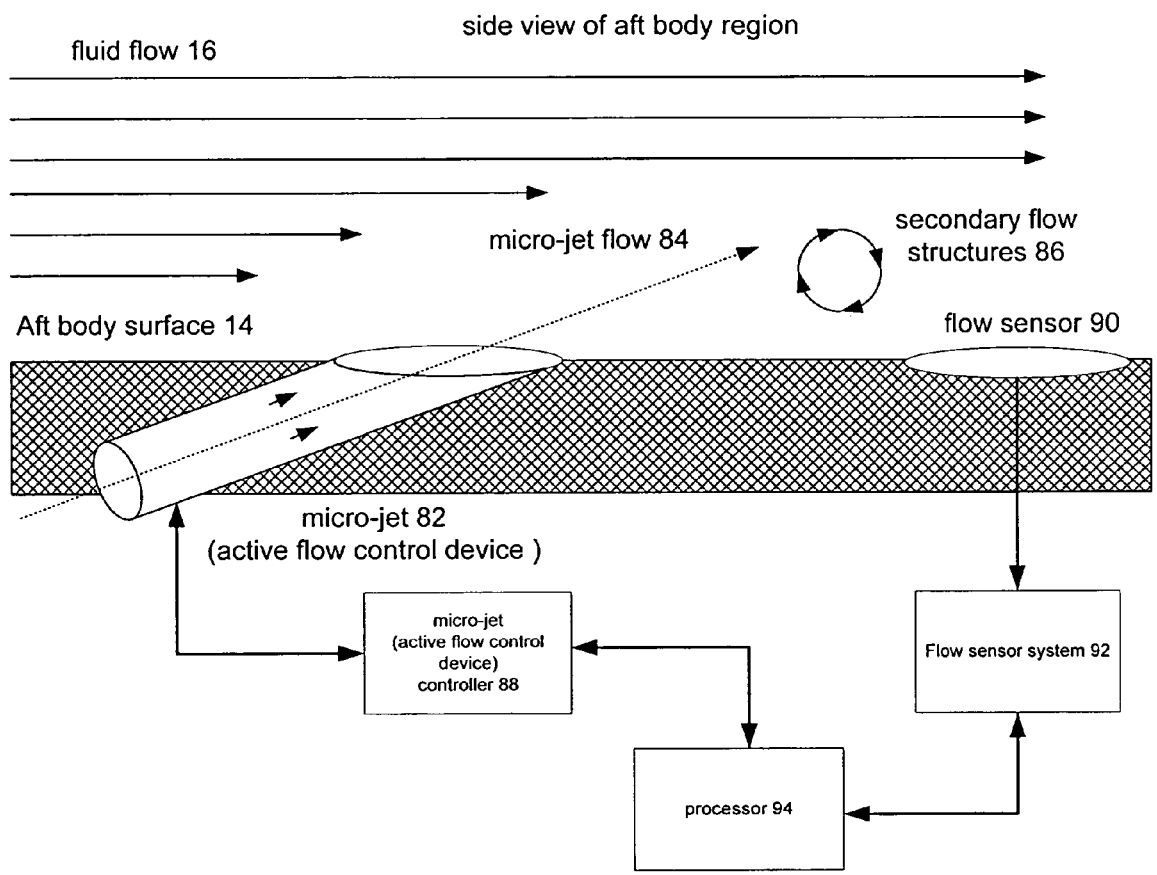
FIG. 7 provides a functional diagram of an aft body region aerodynamic surface operable to sense flow conditions and influence flow field vortical structures over the aft body region aerodynamic surface in accordance with the present invention.

FIG. 7 depicts an aerodynamic surface within the aft body region of aircraft 10. Here arrays of flow control devices 82 are located substantially upstream of disturbances 18 over the aft body region. Flow control devices 82 introduce micro-jet flow 84 to create secondary flow structures 86 in the near wall boundary layer. The secondary flows structures 86 can reduce boundary layer separation and improve the flow over the aft body region.

Secondary flow structures 86 may influence the inception point, size, and trajectory of flow field vortical structures over aft body region 14. A control system, such as flow control device controller 88, may be operably coupled to active flow control devices 82. This control system is operable to actively direct the introduction of secondary flows 86 in order to achieve a desired fluid flow 16 over aerodynamic surface 14.

This active control may be further complemented by a sensing system operably coupled to the flow control device controllers. This sensing system may employ flow sensors 90 located at various locations along the aerodynamic surface. These flow sensors are operable to detect the characteristics of fluid flow 16 over the aerodynamic surface. Sensor outputs are provided to flow sensor system 92 and processor 94. Processor 94 compares the detected fluid flow characteristics over the aerodynamic surface with a desired fluid flow characteristic. Then processor 94 will actively direct flow control device controller 88 to introduce secondary flows 86 to achieve a desired fluid flow over the aft body region.

Processor 94 and controller 88 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

As previously stated, these flow control devices and flow sensors may be incorporated in any aerodynamic surface. However, in many instances, more value may be realized by placing these systems within receptive zones of the aft body region. The desired fluid flow may avoid having flow field vortical structures adversely impact the aft body region components. The desired fluid flow also reduces the fatigue, buffeting or required hardening of the aft body region.

Micro-jets are very-small-scale devices. In some embodiments theses jets are on the order of one-tenth of the boundary layer thickness. These micro-jets may be miniature vortex generators or vortex generator jets fabricated in many ways and applied as an appliqué to or cast into the surface. The micro-jets may be miniature fluidic jets that introduce momentum in the form of micro-jet flows. These micro-jet flows may be continuous or pulsed and may be bled from the primary flow associated with an engine. Micro-jets may also be micro fabricated mechanical structures incorporated on or in the aerodynamic surface. These may also be synthetic pulsators. Other similarly sized jets, known to those skilled in the art, may also be used as the micro-jets.

Figure 8A:
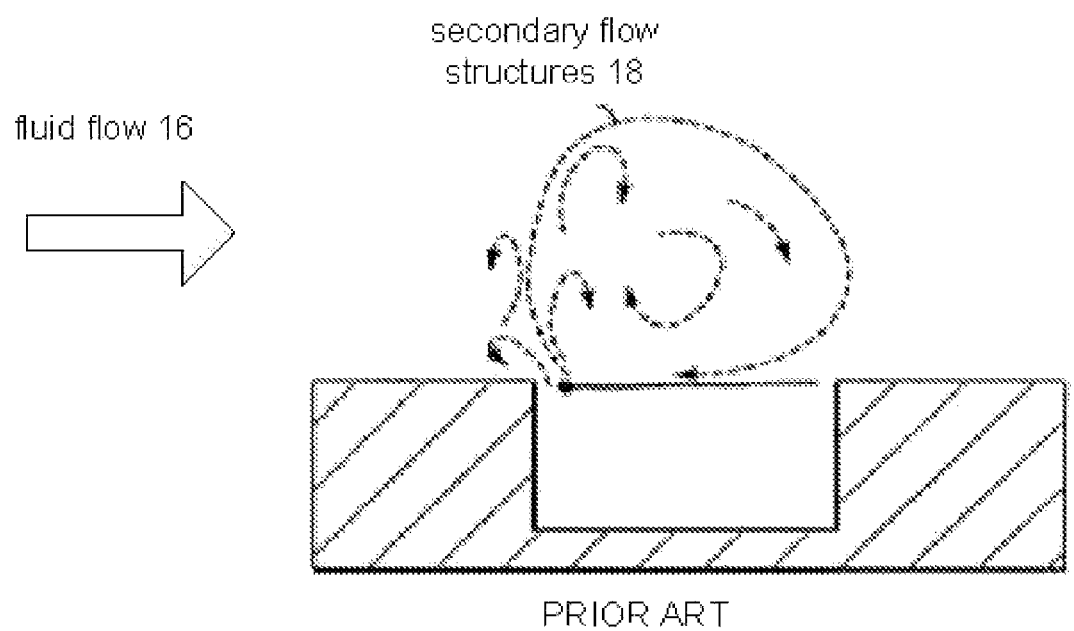
FIGS. 8A-8D depict various potential micro-jets or like devices.
Figure 8B:
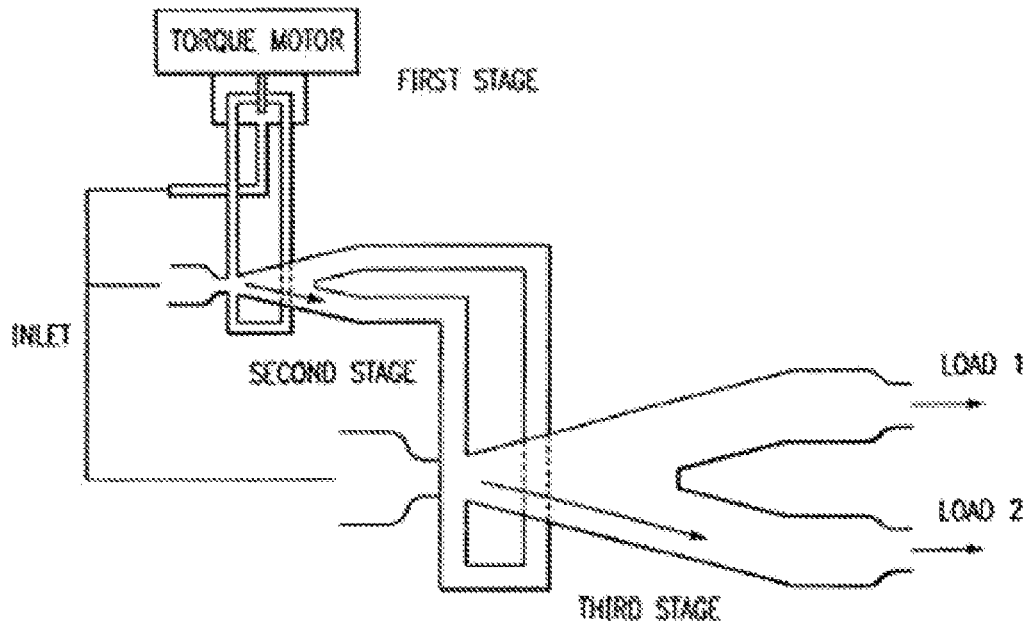

FIGS. 8A-8D illustrates many examples of micro fabricated electro-mechanical structures (MEMS) which may be used as these micro-jets. FIG. 8A depicts a fluidic effector creating secondary flows structures as primary fluid flow 16 passes over fluidic effector. FIG. 8B depicts a pulsing effector. A fluidic oscillator alternates flow between two outflow legs by injecting high pressure on either side of the nozzle orifice. Injecting at Input 1 causes flow to exit the device at Output 2, and injecting at Input 2 causes flow to exit the device at Output 1. The Input flow can come from a like, but smaller device (Second Stage) or from a mechanically driven valve (First Stage).

Figure 8C:
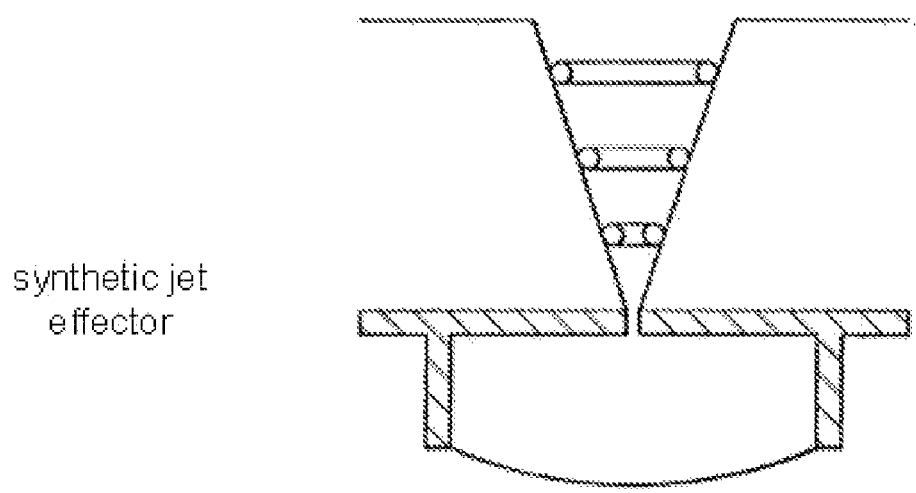
Figure 8D:
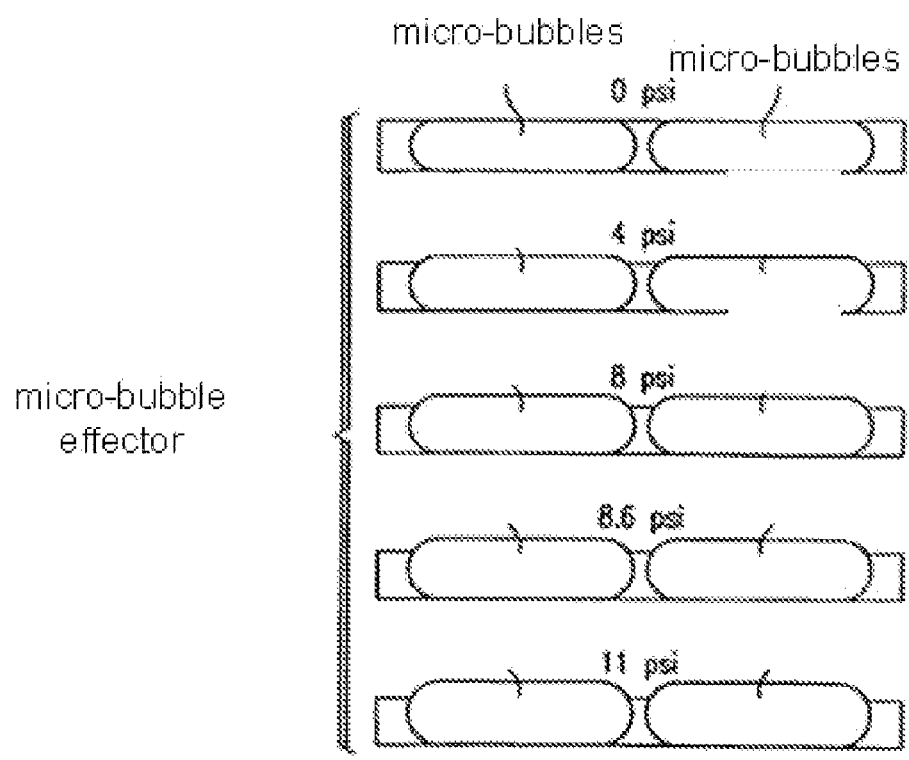

FIG. 8C depicts a synthetic jet effector. This type of effector uses a vibrating diaphragm, which bounds a cavity to generate an air jet. The oscillating surface draws fluid into the cavity from all directions and then expels it in a narrow jet. The resultant pulsed jet has no net mass flow. FIG. 8D presents a micro-bubble effector where micro-bubbles expand based on internal pressure to manipulate secondary flow structures. The effectors listed above are examples of possible MEMS devices, which may be used to manipulate primary fluid flow.

Sensor system 92 may receive input from conventional flow sensors or micro fabricated electro-mechanical sensor devices such as those illustrated in FIGS. 9A, 9B and 9C. FIG. 9A depicts sensor 90 as a MEMS sheer sensor. This device functions in a manner similar to a hot-film sheer stress sensor. A small surface flush with the duct wall is maintained at a constant temperature. The heat flux at the duct wall is then measured. This heat flux can be calibrated to sheer stress.

FIG. 9B depicts sensor 90 as a MEMS pressure sensor. FIG. 9C depicts sensor 90 as a velocity sensor. This device functions in a manner similar to hot-wire anemometers. Electric current is passed through a metal element exposed to the fluid flow. The fluid flow convectively cools the element, effecting a change in its electric resistance. This change in resistance can be related to the velocity magnitude at the sensor through calibration. These sensors may be incorporated into the surface of the aft body region and communicate to sensor system 92, processor 94 and flow control device controller 88.

The aircraft such as depicted in the previous figures may be operable to manipulate flow field vortical structures over the aircraft's aft body region. This reduces buffeting, fatigue and jet wash of the aft body region structures. This involves utilizing the aerodynamic surfaces that have flow control device arrays located substantially upstream of the fluid flow over the aft body region. These flow control device arrays introduce secondary flows in the near wall boundary layer to affect an inception point, size, or trajectory of the flow field vortices over the aft body region. An active control system may operably couple to the flow control device arrays to direct the operation of the flow control devices. Thus, it is not always necessary to have the flow control device arrays actively manipulating the boundary layer conditions. Depending on the angle of attack and velocity of the aircraft, the flow field vortices may not always cause fatigue, buffeting and jet wash of the aft body region.

Figure 10:
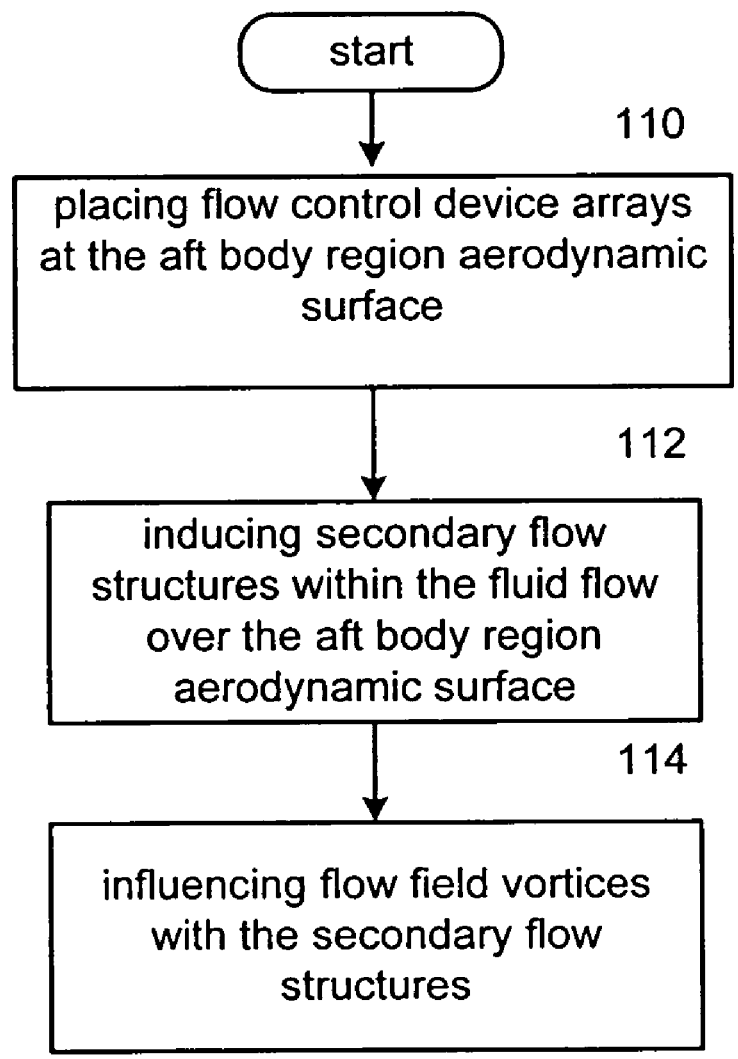
FIG. 10 provides a logic flow diagram illustrating one embodiment of the present invention.

FIG. 10 provides a logic flow diagram illustrating a method associated with the present invention. Generically, this method involves placing the flow control device arrays on the aerodynamic surface in step 110. Then, in step 112, secondary flow structures are induced within the fluid flow over the aft body region within the flow control device arrays. In step 114, flow field vortical structure and flow field separation within the fluid flow over the aerodynamic surface are influenced by the secondary flow structures. The secondary flow structures may specifically influence the inception point and trajectory of the flow field vortical structures.

Figure 11:
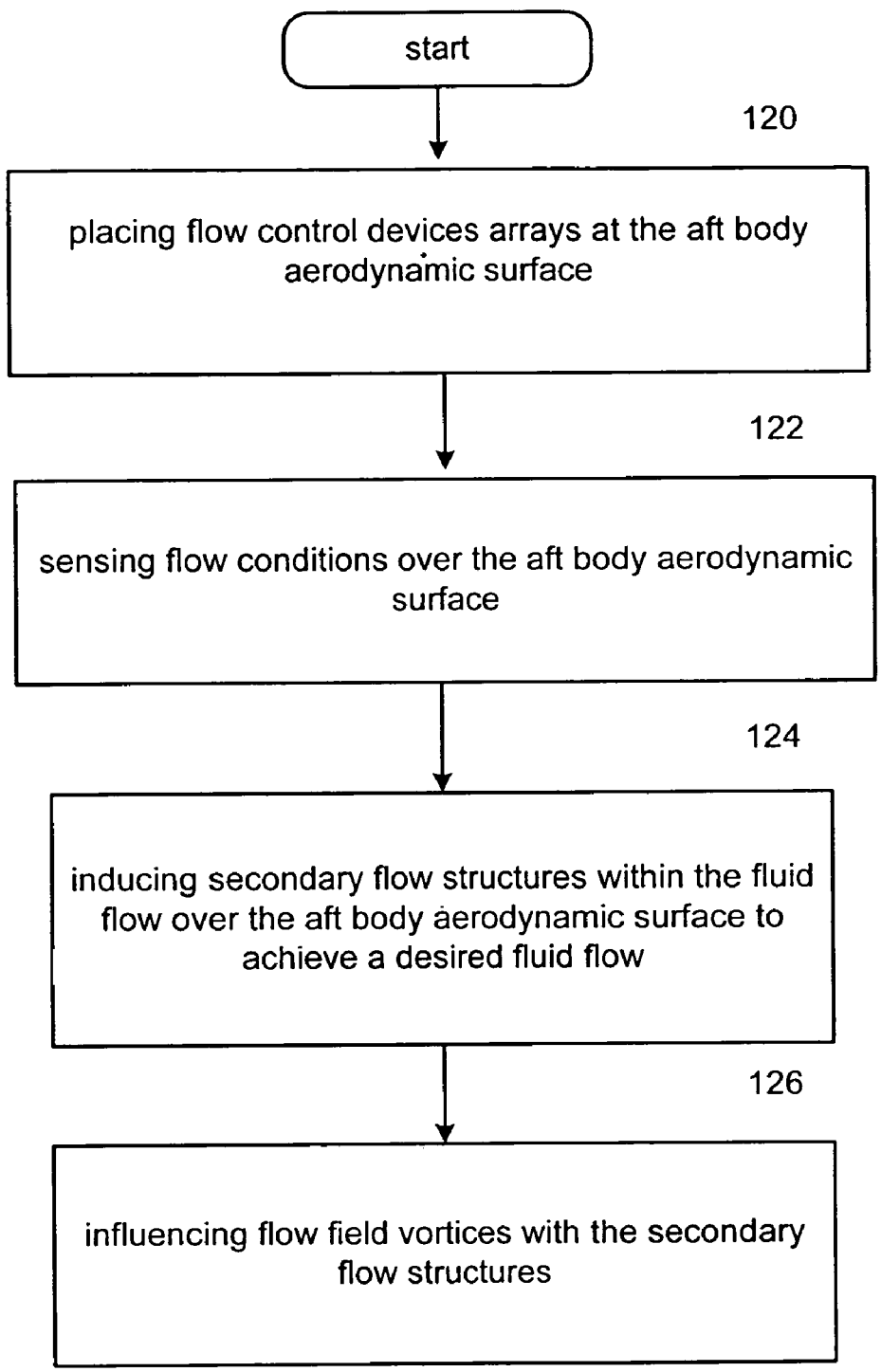
FIG. 11 provides a logic flow diagram depicting one methodology for influencing flow field vortical structures over the aft body region aerodynamic surface in accordance with the present invention.

FIG. 11 provides a second logic flow diagram depicting the methodology associated with the present invention. In step 120, flow control device arrays are placed at the aerodynamic surface. Additionally, sensors at the aerodynamic surface sense flow conditions over the aerodynamic surface in step 122. The sensed flow conditions are used to direct flow control device arrays placed in step 120 to induce secondary flow structures in step 124 within the fluid flow in order to achieve the desired fluid flow. As in FIG. 10, the induced secondary flow structures influence the flow field vortical structures within the fluid flow in step 126.

The present invention enables new and improved aircraft designs of tactical aircraft by allowing unconventional aerodynamic shapes. Next generation aircraft, such as the BWB, X-45, or X-47 are examples of such vehicles employing advanced shaping techniques.

Finally, the advanced design Requirements for exhaust ducting pose significant challenges. The challenges require high aspect ratio and exotic aperture shaping of ducts or top-mounted inlets for ducts. Fluid flow control, such as that taught by the embodiment of the present invention, can be used to mitigate performance impacts on the aircraft. Additionally, attack geometries and sensing internal and external flow conditions at the aircraft and actively manipulating the fluid flow conditions at the aircraft to achieve desired fluid flow conditions at the aircraft will enhance dynamic conditions of the aircraft in flight. Fluid flow may be manipulated to meet several objectives including: (1) reduced component fatigue, (2) stable fluid flow within an internal ducting system, and (3) stable fluid flow external to the aircraft in dynamic geometries.

Additionally, flow control can reduce cyclic fatigue of components located within fluid flow. Stress peak amplitudes experienced by a component within the fluid flow for a normal flow can be greatly reduced by reducing or eliminating interactions between flow field vortical structure or jet wash and structural components.

Embodiments of the present invention may utilize micro vane or micro-jets either in an active or passive form to minimize flow field separation while keeping the flow field attached in order to avoid large scale vortical stress. These vortices create large adverse pressure gradients. Suppressing the growth of the coherence of these vortices suppresses the overall growth of the vortices. This will mitigate the flow field's separation at the back end of the aircraft. This will result in multiple benefits including reduced drag, reduced weight, and may be used as an enabler for compact aircraft with respect to length.

Other embodiments may incorporate active or passive micro-jets or microvanes on legacy aircraft to address drag problems. Such embodiments may take the form of a mechanical applique that molds on the after body in order to reduce drag. Another embodiment may use these active or passive devices in order to manipulate the flow field where an abrupt or steep boat tail angle occurs such as in some exhaust nozzles. The present invention may be used to improve flow behavior in a hydrodynamic application. This may minimize head loss in a piping system, reduce flow noise within a piping system or over a submerged structure or to control and manipulate hydrodynamic flow about a watercraft for direction and thrust control.

Further embodiments of the present invention may include air-handling units such as HVAC systems, chemical processors, and automobile air intake manifold or biomedical applications. However, the present invention should not be limited to these applications.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention.

What is claimed is:

1. A method to suppress flow field separation within an aft body flow field, comprising:

placing at least one upstream array of flow control devices proximate to an aerodynamic surface of an aft portion of an aircraft above and proximate to an engine exhaust port of the aircraft, and at least one downstream array of flow control devices proximate to an aerodynamic surface below the engine exhaust port of the aircraft;

inducing secondary flow structures within a boundary layer of the fluid flow with the flow control devices, to suppress flow field separation and reduces buffeting, fatigue and/or jet wash of the aircraft.

2. The method of claim 1, wherein suppressing flow field separation aids in dynamically controlling the aircraft.

3. The method of claim 1, further comprising:

sensing flow conditions proximate to the engine exhaust port with a flow sensor system; and dynamically controlling the upstream and downstream arrays to produce a desired aft body flow field.

4. The method of claim 1, wherein the upstream and downstream arrays of flow control devices inject momentum into a near-wall boundary region.

5. The method of claim 1, wherein the upstream and downstream arrays of flow control devices comprises micro fabricated mechanical structures.

6. A flow control system surface operable to suppress flow field separation within a receptive zone on an aircraft having an engine submerged within a body of the aircraft, wherein the flow control system surface comprises:

an upstream array of flow control devices located substantially upstream of fluid flow over the receptive zone upstream, above and proximate to an engine exhaust port, and a downstream, below array of flow control devices located downstream and proximate to the engine exhaust port, wherein the upstream and downstream arrays introduces secondary flows in a near wall boundary layer, wherein the secondary flows effect an inception location and trajectory of flow field vortical structure over the receptive zone; and a controller operably coupled to the upstream and downstream arrays of flow control devices, wherein the controller system directs the upstream and downstream arrays of flow control devices to introduce the secondary flows to achieve a desired fluid flow over the receptive zone.

7. The flow control system surface of claim 6, further comprising: a sensing system operably coupled to the controller, wherein the sensing system detects fluid flow characteristics over the receptive zone.

8. The flow control system surface of claim 7, wherein the control system:

compares the detected fluid flow characteristics over the receptive zone to the desired fluid flow over the receptive zone; and directs the upstream and downstream arrays of flow control devices to introduce the secondary flows to achieve the desired fluid flow over the receptive zone based on the comparison.

9. The flow control system surface of claim 6, wherein the desired fluid flow reduces downstream fatigue, buffeting, and/or jet wash.

10. The flow control system surface of claim 6, wherein the upstream and downstream arrays of flow control device-s comprises active flow control devices.

11. The flow control system surface of claim 6, wherein the upstream and downstream arrays of flow control devices comprises micro-jets.

12. The flow control system surface of claim 11, wherein the micro-jets comprise synthetic pulsators.

13. The flow control system surface of claim 6, wherein the upstream and downstream arrays of flow control devices comprises micro-fabricated mechanical structures.

14. An aircraft having an engine submerged within a body of the aircraft, and a receptive zone located adjacent an engine exhaust port that forms an aft body aerodynamic control surface for manipulating flow field vortices over the aft body aerodynamic control surface, wherein the aerodynamic control surface comprises:
  an upstream array of micro jets located substantially upstream of fluid flow over the aerodynamic surface above and proximate to an engine exhaust port of the aircraft, and a downstream array of micro jets proximate to an aerodynamic surface below the engine exhaust port of the aircraft, wherein the upstream and downstream arrays of micro jets introduce secondary flows structures within a boundary layer of the fluid flow, wherein the secondary flows reduces flow field separation over the aft body aerodynamic control surface; and
  a control system operably coupled to the upstream and downstream arrays of micro jets, wherein the control system directs the upstream and downstream arrays of micro jets to introduce secondary flows in order to achieve a desired flow field over the aft body aerodynamic control surface.

15. An aft body region of an aircraft having a blended wing body with an engine submerged in the blended wing body, and reduced structural requirements comprising:
  an upstream array of flow control devices located substantially upstream and proximate to the aft body region of the aircraft and upstream, above and proximate to an engine exhaust port of the aircraft, and a downstream, below array of flow control devices located downstream and proximate to the engine exhaust port, the aft body region having a substantially continuous surface, the upstream and downstream arrays of flow control devices introducing secondary flows in a near wall boundary layer, wherein the secondary flows suppress flow field separation within an aft body flow field; and wherein suppressed flow field separation within the aft body flow field is operable to reduce buffeting, fatigue and/or jet wash proximate to the aft body region.

* * * * *